United States Patent

Hodjat et al.

[11] Patent Number: 5,947,853
[45] Date of Patent: Sep. 7, 1999

[54] SPUN PULLEY WITH THICK HUB

[75] Inventors: Yahya Hodjat, Oxford, Mich.; Michael H. Kutzscher, London, Canada

[73] Assignee: The Gates Corporation, Denver, Colo.

[21] Appl. No.: 08/698,574

[22] Filed: Aug. 15, 1996

[51] Int. Cl.⁶ .................................................. F16H 55/36
[52] U.S. Cl. ............................................. 474/166; 474/902
[58] Field of Search .................................... 474/174, 902, 474/903, 166; 29/892, 892.1, 892.11; 72/82, 84

[56]  References Cited

U.S. PATENT DOCUMENTS

| | | | |
|---|---|---|---|
| 3,080,644 | 3/1963 | Previte et al. | 474/174 |
| 3,772,928 | 11/1973 | Gobeille | 474/174 |
| 3,851,366 | 12/1974 | Jacobs | 474/174 |
| 3,964,326 | 6/1976 | Mickus | 474/174 |
| 3,994,181 | 11/1976 | Sproul | 474/174 |
| 4,824,422 | 4/1989 | Jocic | 474/170 |
| 5,049,115 | 9/1991 | Kunkel et al. | 474/174 |
| 5,441,456 | 8/1995 | Watanabe et al. | 474/94 |
| 5,465,485 | 11/1995 | Miyake et al. | 474/902 |
| 5,619,879 | 4/1997 | Friese | 72/82 |

FOREIGN PATENT DOCUMENTS 4444526  11/1995  Germany .

OTHER PUBLICATIONS

"Make : LIGHT TRUCK,Year : 96, Model:Pickup 4×2/Suburban/Yukon 4×2" TCOI –007 Feb. 14, 1996—General Motors.

*Primary Examiner*—Tamara L. Graysay
*Assistant Examiner*—Matthew A. Kaness
*Attorney, Agent, or Firm*—C. H. Castleman, Esq.; H. W. Oberg, Esq.; S. G. Austin, Esq.

[57]  ABSTRACT

A pulley with an integral hub spun-roll formed of a disc of sheet metal where the hub has a thickness greater than the thickness of the sheet metal. The hub has a bore and external surface for attaching to other components.

11 Claims, 5 Drawing Sheets

5,947,853

SPUN PULLEY WITH THICK HUB

BACKGROUND OF INVENTION

The invention relates to a pulley of sheet metal made by spin-roll forming, but more particularly, the invention relates to a spun pulley with a thick hub and a method of making the pulley.

In some pulley designs, machined hubs are attached to webs and rims formed of sheet metal. A sheet metal web (or disc) and rim may be attached to a machined hub such as by bolts attached to a spider as disclosed in General Motors Technical Bulletin TC01-007 (Feb. 14, 1997) or it may be attached to the hub such as by welding or brazing. A machined hub may provide complicated shapes and thicknesses that permit the pulley to be attached to more than one component. For example, the aforementioned General Motors Technical Bulletin discloses a hub with a spider that attaches to a cup shaped sheet metal pulley by means of bolts and lock washers. The hub has a bore that attaches to a shaft of a water pump pulley. The hub is sufficiently thick to include external threads which define a fastener for attaching the pulley to a clutch for a fan. The hub for attaching the clutch is in an oppositely facing direction from the rim of the pulley with its belt engaging surface. While a machined hub may provide complicated shapes for attaching to shafts, pulleys and clutches, it introduces the attendant problems of weight, expense, and manufacture, and a troublesome process of precisely attaching and aligning the web and rim to complete the pulley.

Hubs or pulleys of sheet metal may be shaped by press forming using a series of dies to form a drawn cup or by spin forming using mandrel and rollers or a combination thereof. For example, a pulley with an integral hub that is press formed is disclosed in U.S. Pat. No. 5,441,456 where the hub has a stepped bore as shown in FIG. 5 and a bore with spline receiving grooves as shown in FIG. 8. Another example of a pulley with an integral hub is shown in U.S. Pat. No. 4,824,422. A limitation with the press forming and spin forming processes is that the hub is of a limited thickness where it is always less than that thickness of the sheet metal from which it was made. Consequently, such hubs are of limited strength and are not readily adaptable for attachment to other components at the hub's external diameter.

German Patent No. 4444526 discloses a method of shaping a hub by spin forming where a shaping roller is pressed against a side of a spinning annular disc of sheet metal that is supported at an opposite side with a head stock mandrel. The shaping roller is moved progressively radially inwardly against the side of the rotating disc which displaces a portion of metal while thinning part of the disc in forming a side wall web having a thickness that is less than the original sheet metal thickness. An annular wave is formed as metal is displaced and which progressively axially extends. The shaping roller is moved axially and is followed by a shaping roller which presses the so annularly displaced metal against a mandrel while simultaneously forming a hub integral to the disc and having a thickness that appears to be about equal to that of the disc. Similarly, U.S. patent application Ser. No. 08/68898 discloses a spin-rolled forming process where the thickness of the hub is about equal that of the disc. Neither of these processes disclose a hub having a sufficient thickness to provide a means for attaching it at an external diameter to other components such as a threaded nut of a fan clutch.

SUMMARY OF THE INVENTION

A pulley with an integral hub in accordance with the present invention is spun-roll formed where a portion of sheet metal is radially and axially displaced from a side of a disc leaving a web. The so formed hub has a radial thickness that is greater than the web and more preferably, greater than the thickness of the disc from which it was formed. A rim of generally tubular shape extends from the web in an axially opposite direction from the hub and is formed of an outer annular part of the disc and is integral with the web.

During the process, a shaping roller is pressed against a side of the annular disc of sheet metal. The shaping roller is moved progressively radially inwardly against the side of the rotating disc which displaces a portion of metal in the form of an axially extending annular wave. The so displaced metal is pressed by an axially moving shaping roller against a mandrel to form a hub that is integral with the web. Optionally, the web may be pressed to form a cup that faces away from the so formed hub. A shaping roller is pressed against a radially outermost portion of the disc while axially displacing a portion of metal against a rotating head stock mandrel. The disc is thinned and the radially outermost portion thereof forms a rim of generally tubular shape that extends from the web solely and in an axially opposite direction from the hub and defines a belt receiving surface.

An object of the invention is to provide a pulley with a hub that is integral to a web and rim and where the hub has sufficient thickness to be configured to attach to another component such as by way of example, a threaded fastener.

Another object of the invention is to provide a method of spin forming a hub with a thickness that is sufficient to attach another component such as by way of a threaded fastener.

Still another object of the invention is to provide a pulley for a water pump that is of a single one piece construction as compared to a prior art water pump pulley of ten parts.

These and other objects or advantages of the invention will be apparent after reviewing the drawings and description thereof wherein.

DESCRIPTION OF PREFERRED EMBODIMENT

Figure 1:
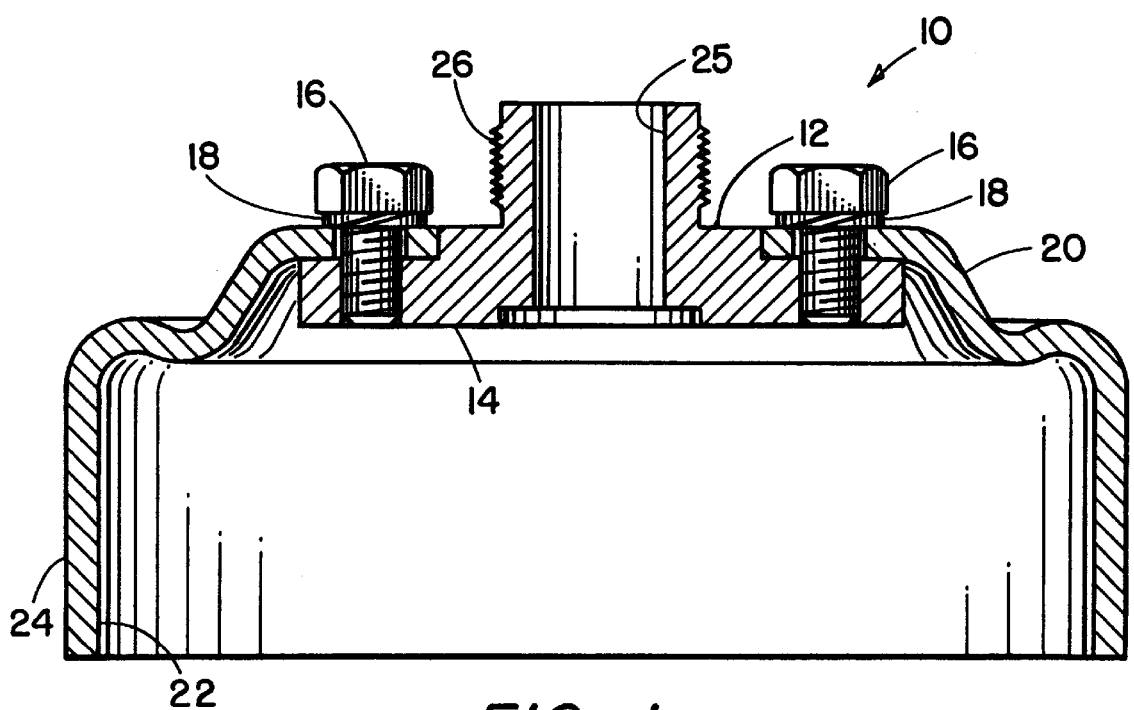
FIG. 1 is a diametrical cross section of a prior art ten piece water pump pulley such as of the type disclosed in General Motors Technical Bulletin TC01-007.

Referring to FIG. 1, a prior art ten piece water pump pulley 10 is illustrated. The pulley includes a machined hub 12 that attaches by way of an integral spider 14 and bolts 16 (two of four shown) with lock washers 18 (two of four shown) to a web 20. A rim 22 of generally tubular shape extends from the web in an axially opposite direction from the hub and defines a belt receiving surface 24. The web and rim are typically made of sheet metal by a pressing operation where a disc of sheet metal is drawn into and forms a thinner cylindrical cup. The pressing or drawing operation thins the sheet metal side wall of the cup.

The hub for such pulleys has a bore 25 for attachment to a shaft such as that of a water pump pulley (not shown). The hub has a requisite thickness that allows threads 26 to be formed at its cylindrical outer surface as a means for attaching the pulley to a second component such as female threads of a fan clutch. A 149 mm diameter pulley of ten assembled parts weighs approximately 1.566 kilograms (3.45 pounds).

Figure 2:
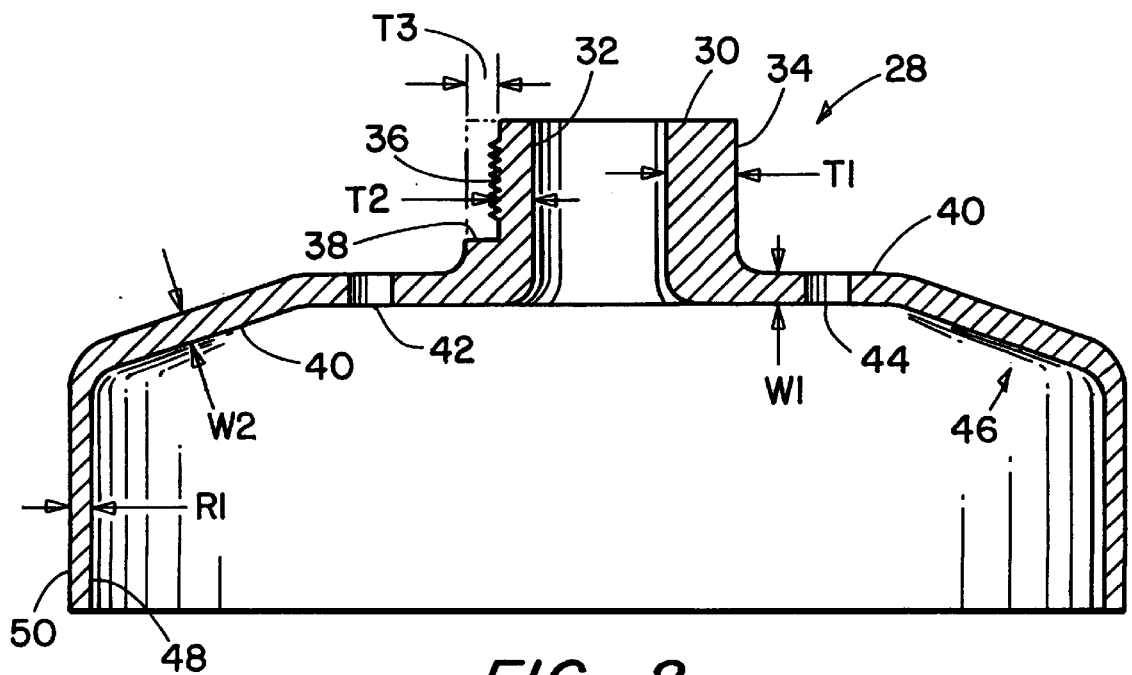
FIG. 2 is a diametrical cross section of a one piece pulley of the invention.

Referring to FIG. 2, a one piece pulley 28 of the invention has an integral hub 30 that is spun-roll formed from a disc. The hub has a bore 32 and a generally cylindrical surface 34 which may be machined or otherwise processed and configured as a fastener such as a threaded boss 36. Before machining, the hub as a radial thickness T1. After machining, the hub has a radial thickness T2 as a portion T3 (shown in phantom) may be removed by a machining process. Of course, the threads may be formed by a rolling process whereby no hub material is removed. Optionally, an annular radial surface 38 is provided (only partially illustrated) and may be established when the threads are formed. The surface defines a stop such as for an internally threaded nut (not shown). The thickness of the hub T1 is preferably thicker than the sheet metal disc from which it is formed and 1.1–2 times the web thickness. The machined thickness of the hub T2 is optionally 1.4–1.5 times greater than a thickness W1 of the web near the rim and a thickness W2 near the rim. The web 40 may optionally include holes 42, 44 that are sized to receive pins of a spanner wrench (not shown) as a means to prevent rotation of a pulley when it needs to be held from rotation. Optionally, the web may be cupped 46 in a direction away from the hub. A rim 48 of generally a tubular shape extends from the web solely in an axially opposite direction from the hub. The rim 48 as shown has a generally cylindrical belt receiving surface 50. In a preferred embodiment, the rim has a thickness R1 which is less than the web thickness W1, W2.

METHOD

Referring to FIGS. 3–6, an annular disc 52 having a thickness 54 is positioned for working with spin-roll forming machinery 56 that includes a head stock mandrel 58, a reciprocally moveable mandrel 60, a first shaping roller 64, a holding roller 66, and a second shaping or finishing roller 68.

Figure 3:
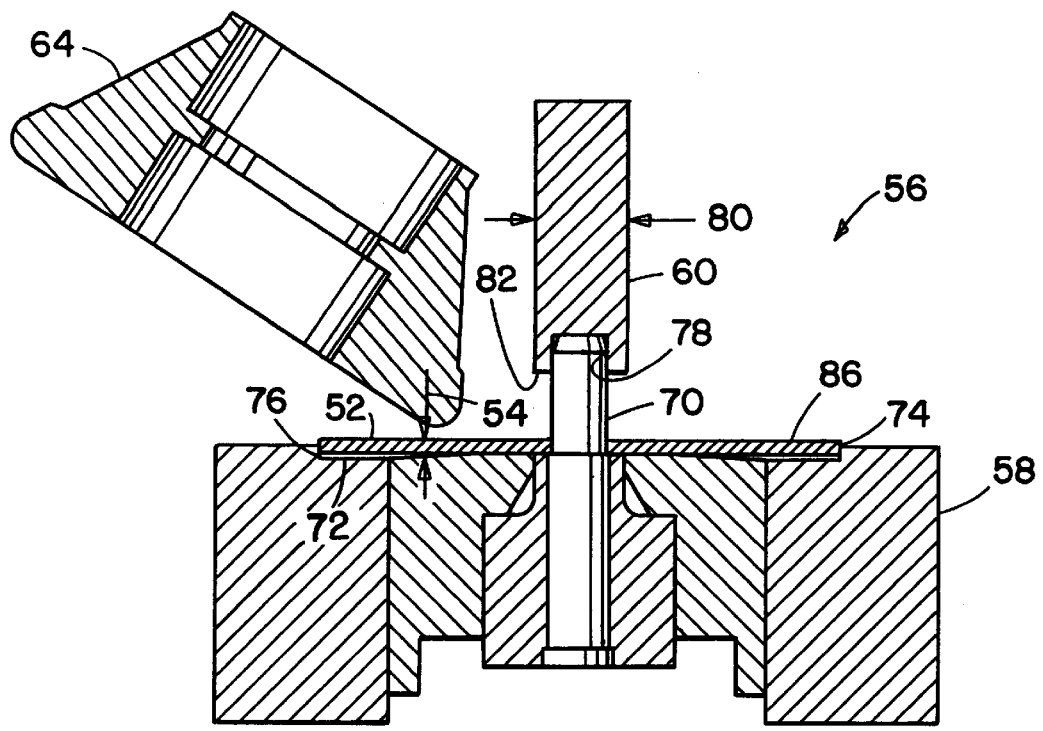
FIG. 3 is a schematic in cross section illustrating key elements of a spin-roll forming machine and an annular disc positioned in the machine for spin-roll forming.

In FIG. 3, the annular disc 52 is positioned over a pilot 70 of the head stock mandrel 58 where the outside diameter of the pilot is sized for an inside diameter of the hub to be produced. The head stock mandrel 58 has a cylindrical recess 72 sized to receive the external diameter 74 of the disc and the recess has a depth 76 that is less than the thickness 54 of the disc.

The mandrel 60 has a pilot receiving bore 78 sized to receive the pilot, an external diameter 80, and a radial step 82 sized for a desired thickness of the hub to be formed. The mandrel 60, first shaping roller 64, holding roller 66, and second shaping roller 68 are positioned away from the head stock mandrel 58 in a start position to facilitate loading and positioning of the annular disc 52 over the pilot and against the head stock mandrel.

Figure 4:
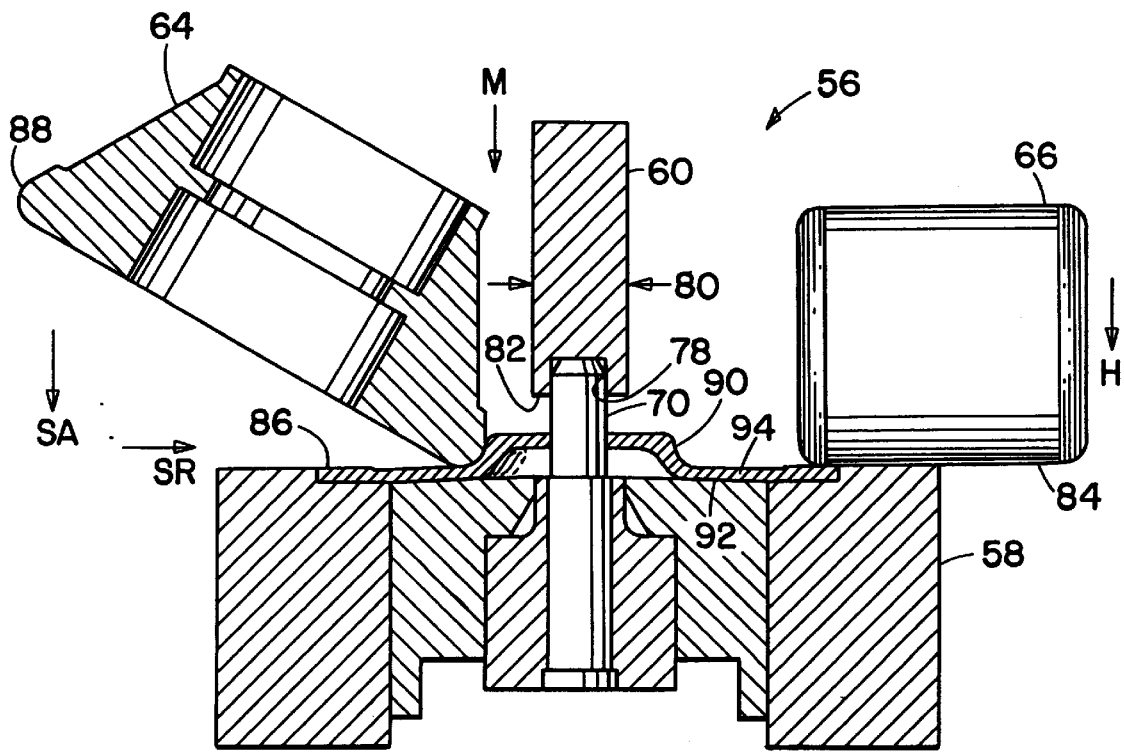
FIG. 4 is a view similar to FIG. 3 but showing a machine at a progressive operational step.

FIG. 4 shows the spin-roll forming machine 56 in an intermediate run position where the annular disc 52 is being shaped into a form, that when finished, includes an integral hub. The mandrel 60 is moved in an axial direction M so that pilot 70 is engaged with the pilot receiving bore 78. Holding roller 66 is shown in its operating position where it is moved in a direction H such that a cylindrical surface 84 presses against an exposed annular portion 86 of the disc to thereby hold it in a sandwiched position against the head stock mandrel.

The shaping roller 64 is transferred to its forming position by first moving it in a direction SA so that a rounded edge 88 of the shaping roller is pressed against the disc. The mandrel and head stock are rotated which spins the disc. Holding roller 66 and shaping roller 64 are free to rotate to spin the disc. The shaping roller with its rounded edge 88 displaces a portion of metal from the disc which is supported at an opposite side by the head stock mandrel. The shaping roller is moved SR progressively radially inwardly against the side of the disc which displaces metal from the side of the disc and thins the disc while forming a web 92 having a thinner side wall 94. The shaping roller forms a progressive axially extending wave 90 of displaced metal.

Figure 5:
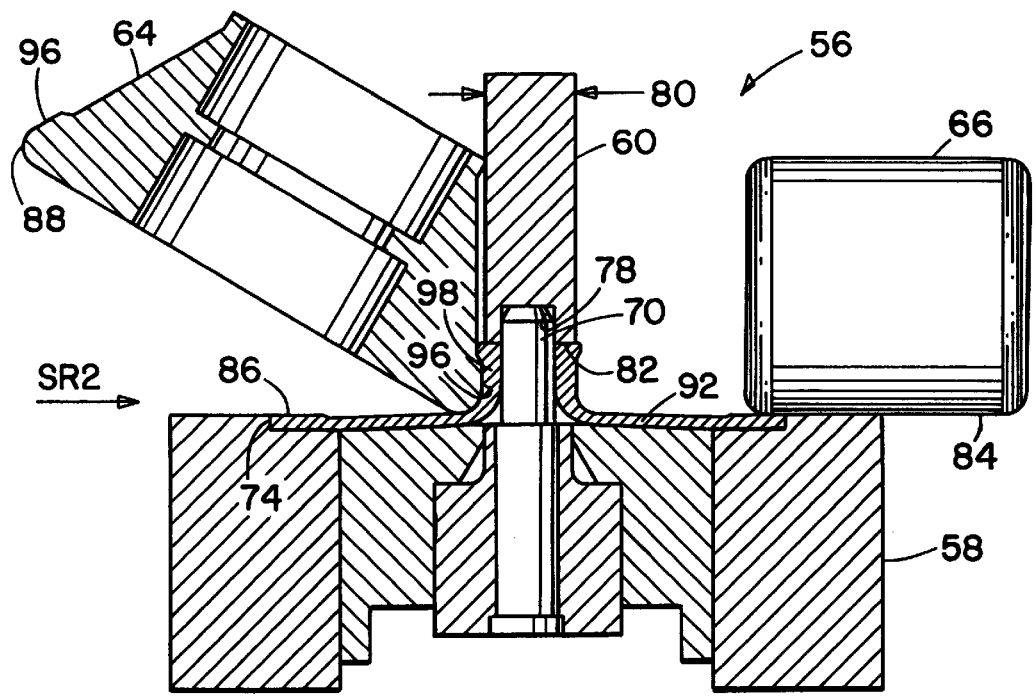
FIG. 5 is a view similar to FIG. 3 but showing a machine at a progressive operational step.

Referring to FIG. 5, the shaping roller continues to move progressively radially inwardly in the direction SR2 and the displaced metal lengthens axially and it is contacted by a tapered surface 96 of the shaping roller. The tapered surface is oriented so as to be substantially parallel to the axes of the head stock mandrel 58 and mandrel 60. Contact with the tapered surface causes the wave to take an initial hub shape 98.

Figure 6:
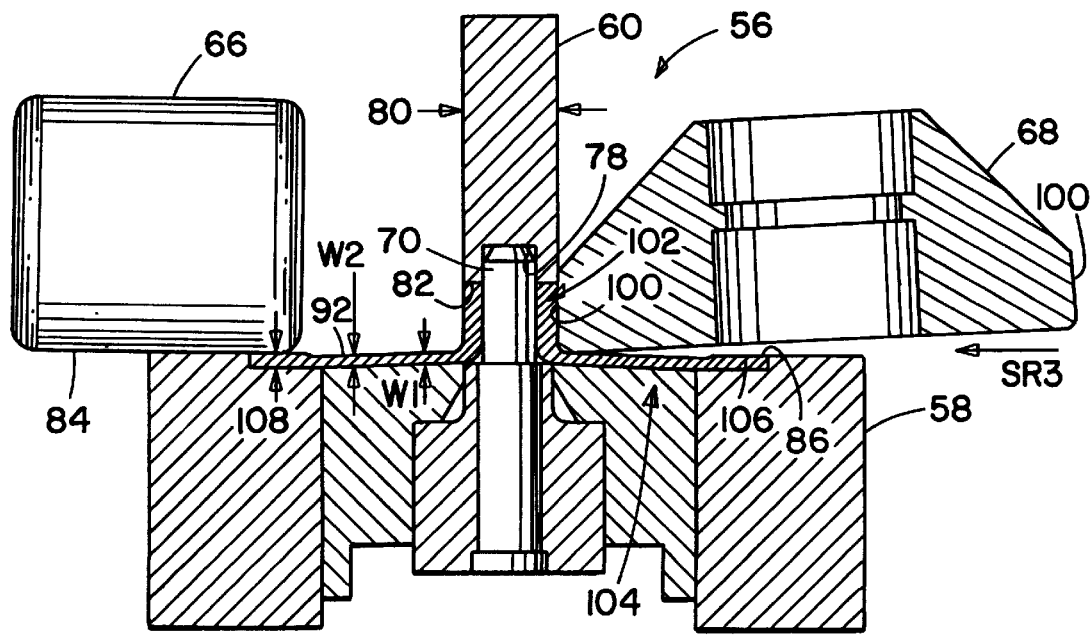
FIG. 6 is a view similar to FIG. 2 but showing a machine positioned at a progressive operational step.

The radially inward movement of the first shaping roller is stopped at a predetermined position as it approaches the mandrel 60. As shown in FIG. 6, the secondary shaping or hub finishing roller 68 is activated and positioned with a tapered surface 100 against the displaced metal forming the hub. The tapered surface 100 is positioned to be substantially parallel with the axes of the rotating head stock mandrel 58 and mandrel 60 when it is in contact with the displaced metal that forms the hub. The shaping roller is moved progressively radially inwardly in the direction SR3 which presses the displaced metal against the mandrel 60 forming a hub 102 which is integral with the disc. The displaced metal leaves a thinner side wall or web 92 having a thickness W1, W2. The so formed disc 104 with integral hub 102 as shown in FIG. 6 is removed from the machine so that the tooling can be changed for subsequent processing steps. The pre-form disc 104 has an outer annular portion 106 with a thickness 108 which corresponds to the original thickness of the disc.

Figure 7:
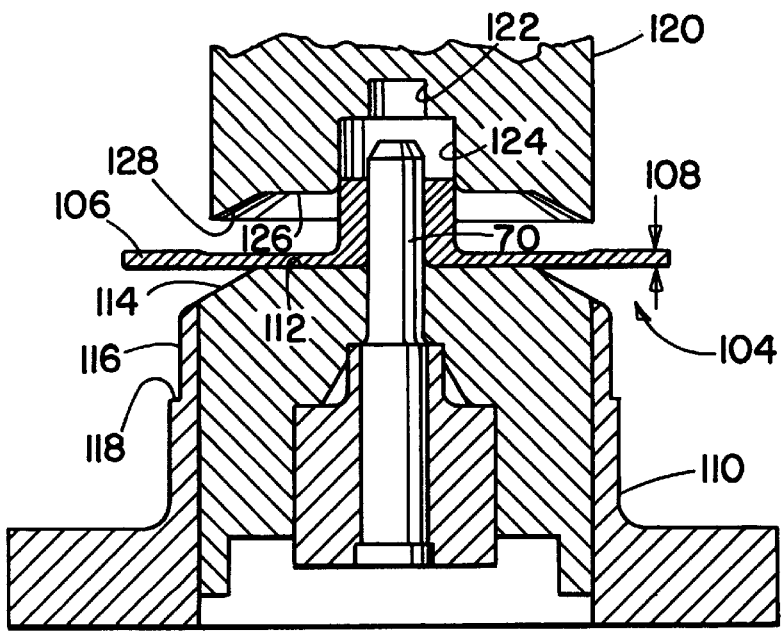
FIG. 7 is a view similar to FIG. 1 but showing the partially completed pulley of FIG. 6 with the integral hub placed in the spin-roll forming machine with different tooling.

Referring to FIG. 7, the changed tooling includes a head stock mandrel 110 with pilot 70, a radial surface 112 that extends to a convex tapered surface 114, and a cylindrical surface 116. The cylindrical surface 116 has a radial step 118 that corresponds to a desired thickness of a rim to be formed. The reciprocally moveable mandrel 120 has a pilot receiving bore 122, a hub receiving bore 24, a radial surface 126 that extends into a concave tapered surface 128. The concave tapered surface is disposed substantially parallel to the convex tapered surface 114.

The preformed disc 104 is placed over the pilot 70 and against the radial surface 112 of the head stock mandrel. The outer annular portion 106 of the preformed disc 104 extends radially beyond the moveable mandrel 120 and cylindrical surface 116.

Figure 8:
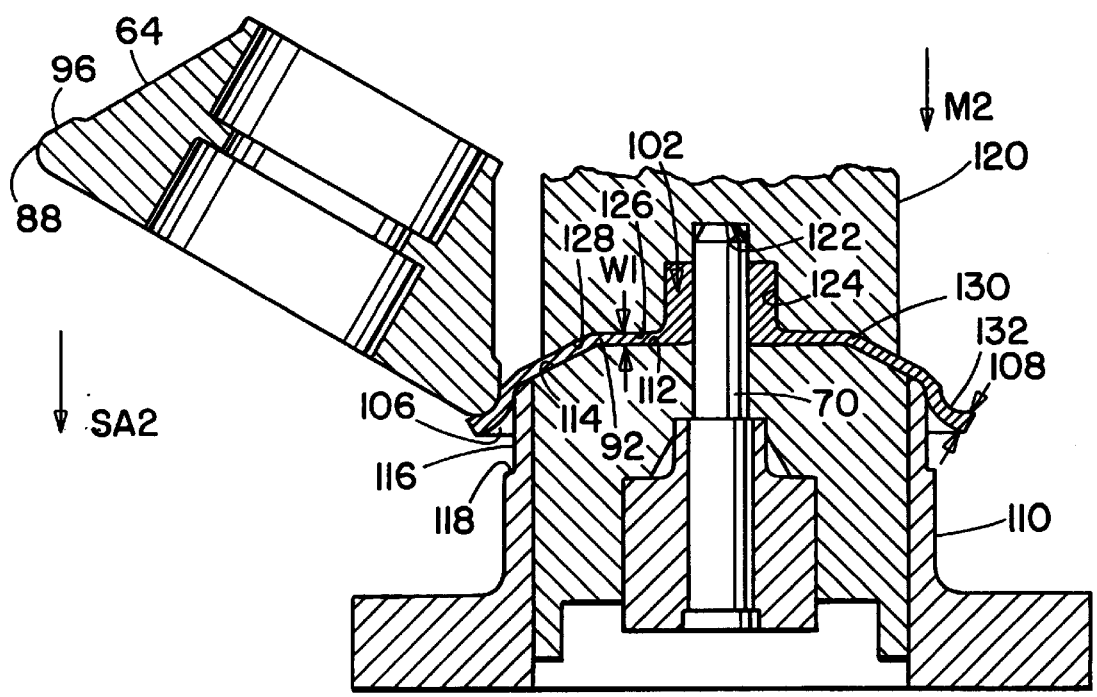
FIG. 8 is a view similar to FIG. 7 but showing a progressive operational step.

Referring to FIG. 8, the moveable mandrel 120 is moved axially M2 toward the head stock mandrel 110 which bends 130 and forms part of the web 92 into a cup shape that follows the tapered surfaces 114, 128. Shaping roller 64 with its rounded edge 88 is moved axially SA2 and pressed against the outer annular portion 106 of the disc which axially displaces the outer annular portion 106 leaving a transitional processing groove 132 therein.

Figure 9:
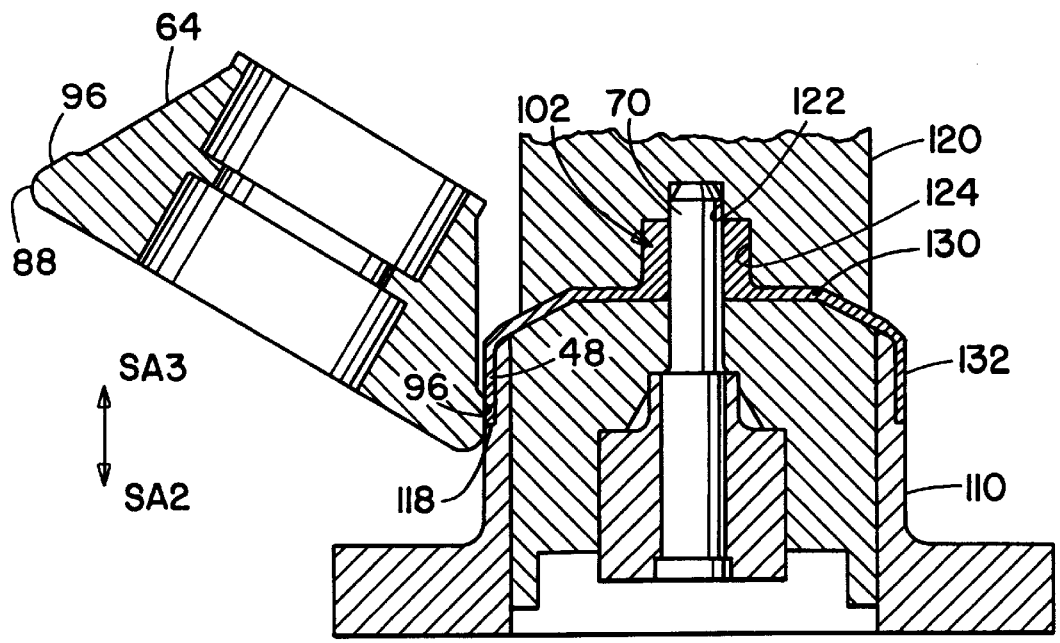
FIG. 9 is a view similar to FIG. 8 but showing a progressive operational step.

Referring to FIG. 9, the shaping roller 64 is moved axially SA2 with its tapered surface 96 pressing against the disc which preforms the rim 48. The shaping roller 64 may be reciprocally moved SA3 to "iron" and thin the rim into shape.

Figure 10:
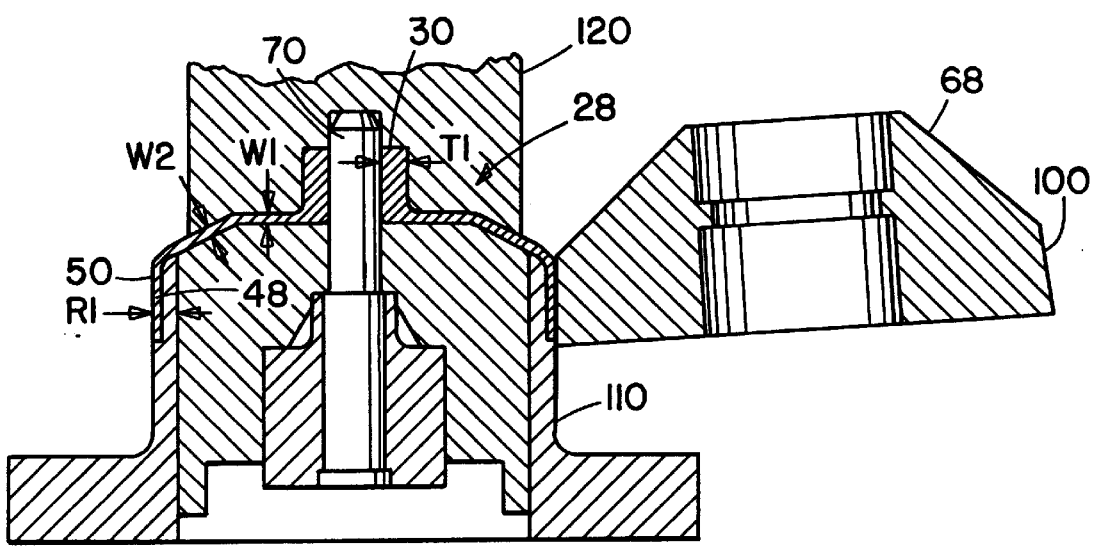
FIG. 10 is a view to similar to FIG. 9 but showing a final spin-roll forming operation with the pulley of the invention still positioned in the spin-roll forming machine.

Referring to FIG. 10, the second shaping roller 68 with its tapered surface 100 is then pressed against the radially outer most portion of the disc which thins the disc and forms a rim 48 of generally tubular shape having a thickness R1 and a belt receiving surface 50 which completes the spin forming process.

To illustrate the effectiveness of the process of the invention, a sheet metal disc was transformed into a pulley of the invention using the process of the invention which is characterized by the following dimensions:

| | |
|---|---|
| disc, outside diameter, mm | 166.00 |
| disc, inside diameter, mm | 18.80 |
| disc, thickness, mm | 5.03 |
| rim, diameter, mm | 148.00 |
| rim thickness, mm | 2.87 |
| web, thickness near rim, mm | 4.62 |
| web, thickness, near hub, mm | 4.27 |
| hub, outside diameter, mm | 33.40 |
| hub, inside diameter, mm | 18.80 |
| hub, threaded diameter, mm | 30.00 |

The so constructed pulley weighed 0.885 kg (1.95 lbs.) in comparison to the prior art ten piece pulley which weighed 1.566 kg (3.45 lbs.) Thus, the pulley of the invention weighed 43.5 percent less than the prior art pulley.

The foregoing detailed description is made for purpose of illustration only and is not intended to limit the scope of the invention which is to be determined from the appended claims.

What is claimed is:

1. A pulley including an integral hub that is spun-roll formed from a disc having a thickness, the hub having an axial length, a bore, a generally cylindrical outer surface extending along the axial length, a radial thickness, and the hub formed with a portion of metal radially displaced from a side of the disc leaving a web portion having a web thickness, and wherein the improvement comprises:

the hub having a requisite radial thickness from the generally cylindrical outer surface to the bore that has been increased to be 1) greater than the web thickness and 2) sufficient to configure threads in the cylindrical outer surface as a fastener, and wherein said outer cylindrical surface is threaded and capable of acting as a fastener.

2. The pulley as claimed in claim 1 wherein the thickness of the hub from the threaded cylindrical surface to the bore is about 1.4–1.5 times a minimum thickness of the web portion.

3. The pulley as claimed in claim 1 wherein the bore of the hub is sized for attachment to a shaft.

4. The pulley as claimed in claim 1 wherein the hub includes an annular radial surface axially spaced from the web and adjacent the threads and wherein the radial surface defines a stop.

5. The pulley as claimed in claim 1 wherein the radial thickness of the hub is about 1.10–2 times the web thickness.

6. The pulley as claimed in claim 1 wherein a rim of a generally tubular shape extends from the web solely in an axially opposite direction from the hub, the rim formed integral with the web.

7. The pulley as claimed in claim 6 wherein the web portion is generally cupped in an axial direction facing away from the hub.

8. The pulley as claimed in claim 1 wherein the rim has a wall thickness that is less than the web thickness.

9. The pulley as claimed in claim 1 wherein the rim has a substantially cylindrical belt receving surface.

10. A pulley including an integral hub that is spun-roll formed from a disc having a thickness, the hub having an axial length, a bore, a generally cylindrical outer surface, a radial thickness, and the hub formed with a portion of metal radially displaced from a side of the disc leaving a web portion having a web thickness, wherein the improvement comprises:

the hub having a radial thickness from the generally cylindrical outer surface to the bore that has been increased to be greater than the web thickness and wherein the generally outer cylindrical surface of the hub is threaded;

a rim of generally tubular shape extending from the web solely in an axially opposite direction from the hub and defining a belt receiving surface, the rim having a wall thickness less than the thickness of the web.

11. A pulley including an integral hub having an axial length, a bore, a generally cylindrical outer surface extending along the axial length, a radial thickness, and the hub integral with a web portion having a web thickness, and wherein the improvement comprises:

the hub having a requisite radial thickness from the generally cylindrical outer surface to the bore that has been increased to be 1) greater than the web thickness and 2) sufficient to configure threads in the cylindrical outer surface as a fastener and wherein said outer cylindrical surface is threaded and capable of acting as a fastener.

* * * * *